(12) United States Patent
Li et al.

(10) Patent No.: US 12,540,847 B2
(45) Date of Patent: Feb. 3, 2026

(54) PHOTOPLETHYSMOGRAPHY FRONT-END RECEIVER

(71) Applicant: REALTEK SEMICONDUCTOR CORPORATION, Hsinchu (TW)

(72) Inventors: Liang-Hui Li, Hsinchu (TW); Yu-Chang Chen, Hsinchu (TW); Ming-Chih Kuan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 755 days.

(21) Appl. No.: 17/950,576

(22) Filed: Sep. 22, 2022

(65) Prior Publication Data

US 2023/0102504 A1 Mar. 30, 2023

(30) Foreign Application Priority Data

Sep. 27, 2021 (TW) .................................. 110135849

(51) Int. Cl.
*G01J 1/42* (2006.01)
*A61B 5/00* (2006.01)
(Continued)

(52) U.S. Cl.
CPC ........ *G01J 1/4204* (2013.01); *A61B 5/02427* (2013.01); *A61B 5/7225* (2013.01);
(Continued)

(58) Field of Classification Search
CPC ...... G01J 1/4204; G01J 2001/444; G01J 1/44; A61B 5/02427; A61B 5/7225; A61B 2560/0247; H03F 3/08; H03F 3/087
See application file for complete search history.

(56) References Cited

U.S. PATENT DOCUMENTS

| 9,130,070 B2 | 9/2015 | Deliwala |
| 9,733,275 B2 | 8/2017 | Deliwala |

(Continued)

FOREIGN PATENT DOCUMENTS

| CN | 104507381 A | 4/2015 |
| WO | WO2021042309 A1 | 3/2021 |

OTHER PUBLICATIONS

OA letter of a counterpart TW application (appl. No. 110135849) mailed on Mar. 1, 2022.7) Summary of the TW OA letter:(1) Claims 1, 7-10 are rejected as being unpatentable over the cited reference 1 (CN104507381A) in view of the common knowledge.(2) Claims 2-6 are rejected as being unpatentable over the cited reference 1 in view of the cited reference 2 (WO2021/042309A1).P.S. Correspondence between the claims of the TW counterpart application and the claims of the present US application:(1) Claims 1, 2, 3, . . . , and 10 of the TW counterpart application are corresponding to claims 1, 2, 3, 4, 6, 7, 9, 10, 11, 12 of the present US application.
(Continued)

*Primary Examiner* — Mariam Qureshi
(74) *Attorney, Agent, or Firm* — WPAT, PC

(57) ABSTRACT

A photoplethysmography front-end receiver is capable of eliminating an error in the estimation of an ambient-light current. The receiver includes a current-to-voltage conversion circuit, an integrator, a switch circuit, and an analog-to-digital converter (ADC). The current-to-voltage conversion circuit converts an input current into a differential voltage signal. The integrator receives the differential voltage signal and outputs an analog output voltage. The switch circuit is set between the current-to-voltage conversion circuit and the integrator, forwards the differential voltage signal to the integrator in a first duration when a controllable light source is turned on, and forwards an inverted signal of the differential voltage signal to the integrator in a second duration when the controllable light source is turned off,
(Continued)

100 wherein the second duration is after or before the first duration. The ADC generates a digital signal for analysis according to the analog output voltage after the second duration.

14 Claims, 8 Drawing Sheets

(51) Int. Cl.
    *A61B 5/024*     (2006.01)
    *H03F 3/08*     (2006.01)
    *G01J 1/44*     (2006.01)

(52) U.S. Cl.
    CPC ........ *H03F 3/08* (2013.01); *A61B 2560/0247* (2013.01); *G01J 2001/444* (2013.01)

(56) References Cited

U.S. PATENT DOCUMENTS

| | | |
|---|---|---|
| 10,056,868 B2 | 8/2018 | Deliwala |
| 2015/0173631 A1* | 6/2015 | Richards .............. A61B 5/7282 600/479 |
| 2022/0247497 A1* | 8/2022 | Jung ...................... A61B 5/681 |

OTHER PUBLICATIONS

Texas Instruments, "Texas Instruments_AFE4404 Ultra-Small, Integrated AFE for Wearable, Optical, Heart-Rate Monitoring and Bio-Sensing" Dec. 2016, Texas Instruments.

Konijnenburg et al. "A_Multibiosensor_Acquisition_System_With_Integrated_Processor_Power_Management_8_times_8_LED_Drivers_and_Simultaneously_Synchronized_ECG_BIO-Z_GSR_and_Two_PPG_Readouts", Nov. 2016, IEEE Journal of solid state circuits.

\* cited by examiner

PHOTOPLETHYSMOGRAPHY FRONT-END RECEIVER

BACKGROUND OF THE INVENTION

1. Field of the Invention

The present disclosure relates to a front-end receiver, especially to a photoplethysmography front-end receiver.

2. Description of Related Art

The photoplethysmography (PPG) technology involves illuminating skin with a controllable light source (e.g., light emitting diode) and measuring the consequent variation in optical absorption, and thus can be applied to multiple kinds of applications (e.g., measurement of heartbeat and blood oxygen). However, in addition to the controllable light source, other light sources (e.g., sunlight and indoor light) occur in the same space. The influence of these other light sources should be eliminated to ensure the accuracy of the measurement of the variation in optical absorption. A general front-end receiver of the PPG technology includes a photo detector (PD) and a transimpedance amplifier (TIA). The PD is for detecting optical energy to generate a current, and the TIA is for converting the current into a voltage that can be used in a following process and for analysis. Some PPG front-end receiver declares that it can eliminate an ambient current caused by ambient light sources, but this PPG front-end receiver does not take the influence of ambient current estimation errors (e.g., integral windup of an integrator of the PPG front-end receiver caused by the estimation errors) into consideration. Such estimation errors could arise from rapid variations in intensity of the ambient light sources.

SUMMARY OF THE INVENTION

An object of the present disclosure is to provide a photoplethysmography (PPG) front-end receiver capable of eliminating an error in the estimation of an ambient-light current.

An embodiment of the PPG front-end receiver of the present disclosure includes a current-to-voltage conversion circuit, an integrator, a switch circuit, and an analog-to-digital converter (ADC). The current-to-voltage conversion circuit is configured to convert an input current into a differential voltage signal, wherein the current-to-voltage conversion circuit includes a positive output terminal and a negative output terminal, the positive output terminal is for outputting a positive-end signal of the differential voltage signal, the negative output terminal is for outputting a negative-end signal of the differential voltage signal, and the positive-end signal and the negative-end signal are complementary signals. The integrator includes a positive input terminal and a negative input terminal, and is configured to receive the differential voltage signal in a first duration and receive an inverted signal of the differential voltage signal in a second duration to output an analog output voltage. The switch circuit is coupled between the current-to-voltage conversion circuit and the integrator, and configured to forward the positive-end signal and the negative-end signal to the positive input terminal and the negative input terminal respectively in the first duration and forward the positive-end signal and the negative-end signal to the negative input terminal and the positive input terminal respectively in the second duration, wherein the second duration can be later or earlier than the first duration. The ADC is coupled to the integrator and configured to generate a digital signal for analysis according to the analog output voltage in a later duration, wherein the later duration is later than any of the first duration and the second duration.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a photoplethysmography (PPG) front-end receiver capable of eliminating an error in the estimation of an ambient-light current.

Figure 1:
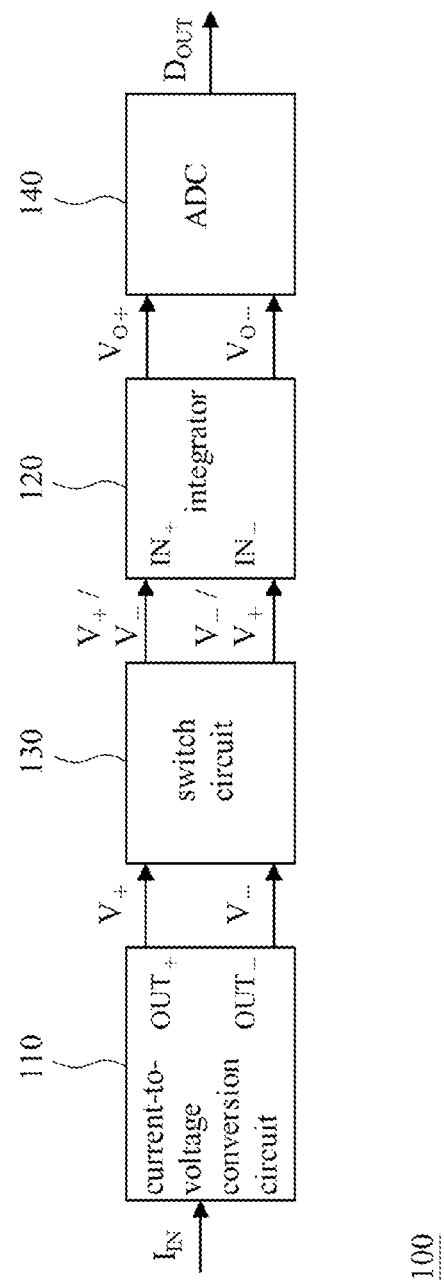
FIG. 1 shows an embodiment of the photoplethysmography (PPG) front-end receiver of the present disclosure.

FIG. 1 shows an embodiment of the PPG front-end receiver of the present disclosure. The PPG front-end receiver 100 of FIG. 1 includes a current-to-voltage conversion circuit 110, an integrator 120, a switch circuit 130, and an analog-to-digital converter (ADC) 140.

In regard to the embodiment of FIG. 1, the current-to-voltage conversion circuit 110 is configured to convert an input current $I_{IN}$ into a differential voltage signal (i.e., $V_+$ and $V_-$ in FIG. 1), wherein the current-to-voltage conversion circuit 110 includes a positive output terminal $OUT_+$ and a negative output terminal $OUT_-$, the positive output terminal $OUT_+$ is for outputting a positive-end signal $V_+$ of the differential voltage signal, the negative output terminal $OUT_-$ is for outputting a negative-end signal $V_-$ of the differential voltage signal, and the positive-end signal $V_+$ and the negative-end signal $V_-$ are complementary signals.

Figure 2:
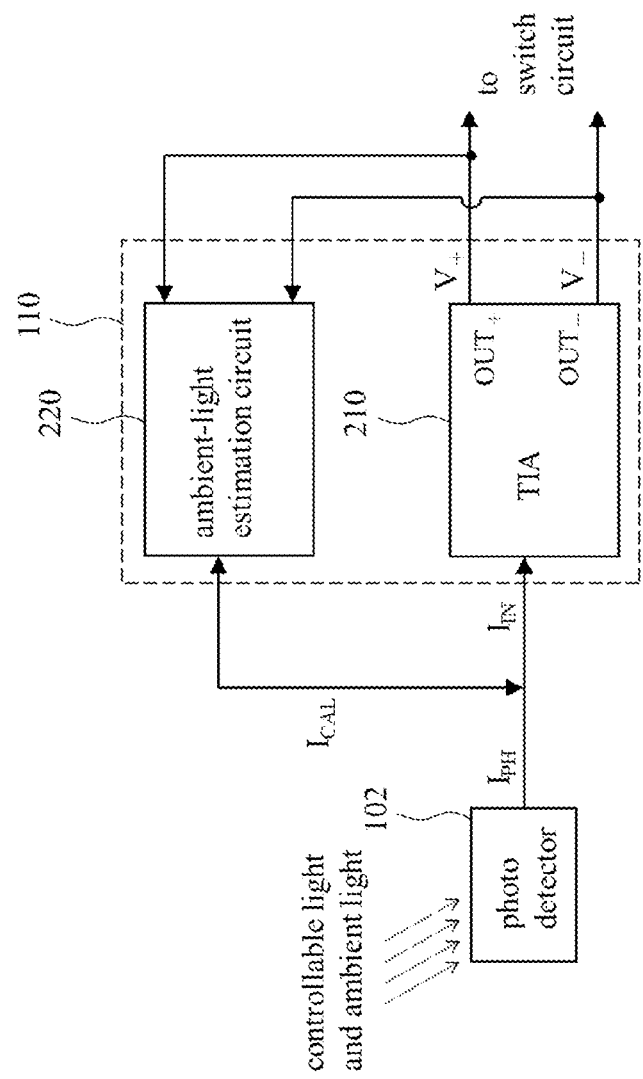
FIG. 2 shows an embodiment of the current-to-voltage conversion circuit of FIG. 1.

FIG. 2 shows an embodiment of the current-to-voltage conversion circuit 110 of FIG. 1. The current-to-voltage conversion circuit 110 of FIG. 2 includes a transimpedance amplifier (TIA) 210 and an ambient-light estimation circuit 220. The TIA 210 is configured to generate the differential voltage signal according to the input current $I_{IN}$. The ambient-light estimation circuit 220 is configured to generate a calibration current $I_{CAL}$ according to the differential voltage signal, wherein the calibration current $I_{CAL}$ is equal to a photoelectric current $I_{PH}$ minus the input current $I_{IN}$, that is to say $I_{IN} \approx I_{PH} - I_{CAL}$. For example, the ambient-light estimation circuit 220 sinks a current and/or sources a current to determine the calibration current $I_{CAL}$. The photoelectric current $I_{PH}$ is generated by a photo detector 102 that can be included in the PPG front-end receiver 100 or set outside the PPG front-end receiver 100 as shown in FIG. 2. The photo detector 102 is configured to detect optical energy and thereby generate the photoelectric current $I_{PH}$.

Figure 3:
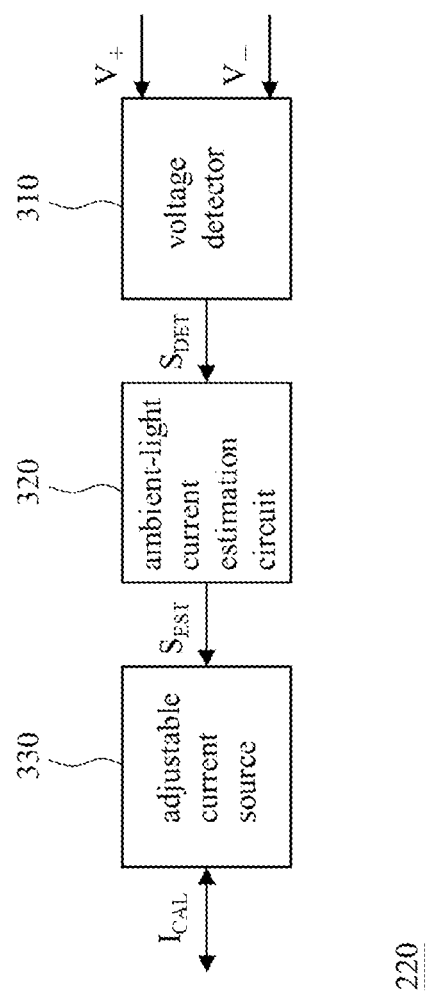
FIG. 3 shows an embodiment of the ambient-light estimation circuit of FIG. 2.

FIG. 3 shows an embodiment of the ambient-light estimation circuit 220 of FIG. 2. The ambient-light estimation circuit 220 of FIG. 3 includes a voltage detector 310, an ambient-light current estimation circuit 320, and an adjustable current source 330. The voltage detector 310 is configured to generate a detection signal $S_{DET}$ according to the differential voltage signal (i.e., $V_+$ and $V_-$ in FIG. 3), wherein the detection signal $S_{DET}$ is dependent on (e.g., proportional to) the difference between the positive-end signal $V_+$ and the negative-end signal $V_-$. The ambient-light current estimation circuit 320 is configured to generate an estimation signal $S_{EST}$ according to the detection signal $S_{DET}$ to control the adjustable current source 330. The adjustable current source 330 is configured to generate the calibration current $I_{CAL}$. It is noted that each of the voltage detector 310, the ambient-light current estimation circuit 320, and the adjustable current source 330 can be realized with known/self-developed technologies, and the voltage detector 310 and the ambient-light current estimation circuit 320 can optionally be integrated into one single circuit.

In regard to the embodiment of FIG. 1, the integrator 120 includes a positive input terminal $IN_+$ and a negative input terminal $IN_-$. The positive input terminal $IN_+$ and the negative input terminal $IN_-$ are used for receiving the positive-end signal $V_+$ and the negative-end signal $V_-$ respectively in a first duration $T_1$, and are used for receiving the negative-end signal $V_-$ and the positive-end signal $V_+$ respectively in a second duration $T_2$; afterward the integrator 120 is used for outputting an analog output voltage (i.e., the differential output signal $V_{O+}$, $V_{O-}$ in FIG. 1) according to the signal it received in the first duration and the second duration. In an exemplary implementation, the second duration $T_2$ is later than the first duration $T_1$; for example, the second duration $T_2$ follows the first duration $T_1$, or the second duration $T_2$ is later than the first duration $T_1$ by a predetermined interval. In another exemplary implementation, the first duration $T_1$ is later than the second duration $T_2$; for example, the first duration $T_1$ follows the second duration $T_2$, or the first duration $T_1$ is later than the second duration $T_2$ by a predetermined interval. The length of the first duration $T_1$ can be the same as or different from the length of the second duration $T_2$. It is noted that: in the first duration $T_1$ a controllable light source (e.g., light emitting diode) (not shown in the figures) is turned on and thus the differential voltage signal includes a part originated from the optical energy of the controllable light source and another part originated from the optical energy of ambient light; and in the second duration $T_2$ the controllable light source is turned off and thus the differential voltage signal is mainly the signal originated from the optical energy of ambient light without the signal originated from the optical energy of the controllable light source.

Figure 4:
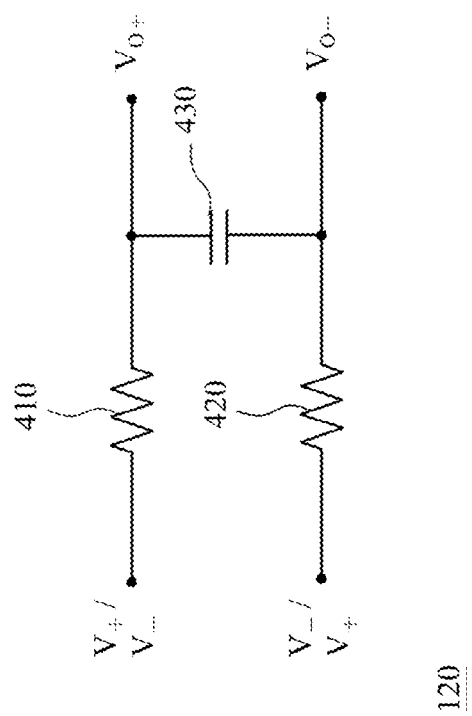
FIG. 4 shows an embodiment of the integrator of FIG. 1.

FIG. 4 shows an embodiment of the integrator 120 of FIG. 1. The integrator 120 of FIG. 4 is a low pass filter including a resistor 410, a resistor 420, and a capacitor 430. The value of each of the resistor 410, the resistor 420, and the capacitor 430 can be determined according to the demand for implementation. Since the low pass filter alone is common in this technical field, its detailed description is omitted here. It is noted that other kinds of known/self-developed integrators can be used as the integrator 120 of FIG. 1, if practicable.

Figure 6:
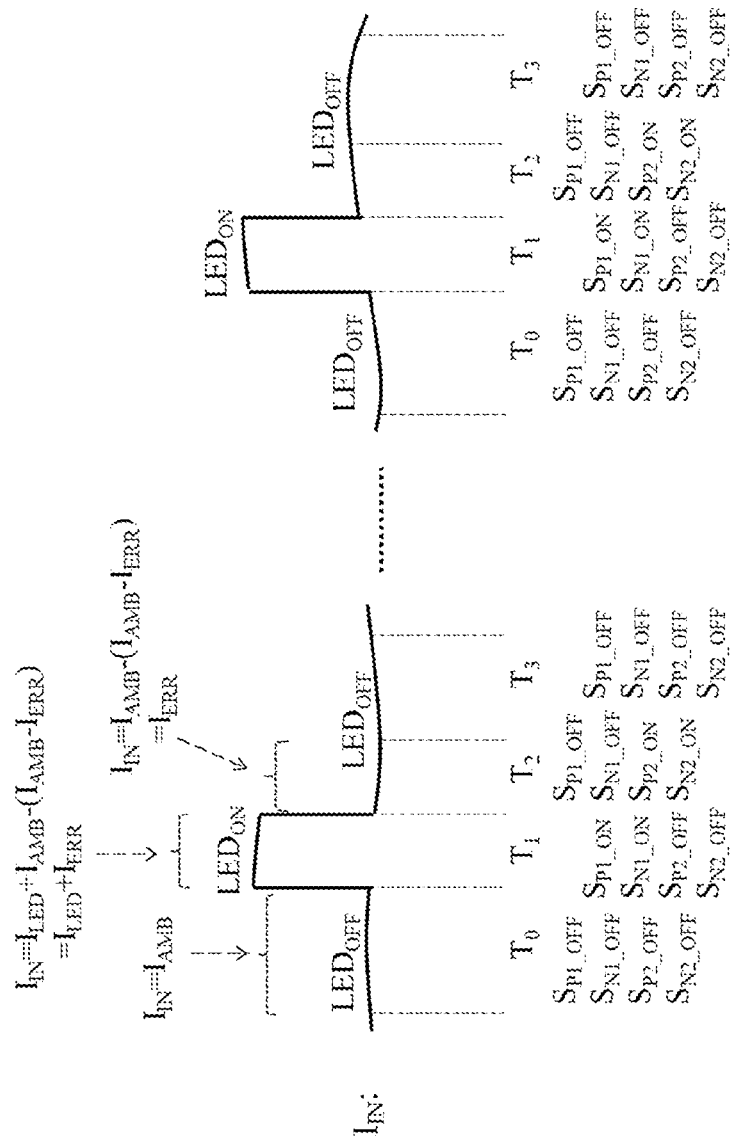
FIG. 6 sows an example of the input current $I_{IN}$ of FIG. 1.

Please refer to FIGS. 1-3. In the first duration $T_1$ the aforementioned controllable light source is turned on and thus the photo detector 102 generates the photoelectric current $I_{PH}$ (i.e., $I_{PH}=I_{PH\_T1}=I_{LED}+I_{AMB}$) including a controllable-light-source current $I_{LED}$ and an actual-ambient-light current $I_{AMB}$. In the second duration $T_2$ the controllable light source is turned off and thus the photo detector 102 generates the photoelectric current $I_{PH}$ (i.e., $I_{PH}=I_{PH\_T2}=I_{AMB}$) which is mainly the actual-ambient-light current $I_{AMB}$ without the controllable-light-source current $I_{LED}$. The calibration current $I_{CAL}$ remains constant in the first duration $T_1$ and the second duration $T_2$, and the calibration current $I_{CAL}$ (i.e., $I_{CAL}=I_{AMB}-I_{ERR}$) is equal to the actual-ambient-light current $I_{AMB}$ minus an error current $I_{ERR}$, wherein the value of the error current $I_{ERR}$ can be a positive value (by sourcing current) or a negative value (by sinking current). In the first duration $T_1$ the input current $I_{IN}$ (i.e., $I_{IN}=I_{PH\_T1}-I_{CAL}$) is equal to the photoelectric current $I_{PH}$ minus the calibration current $I_{CAL}$; in other words, the input current $I_{IN}$ ($I_{IN}=I_{PH\_T1}-I_{CAL}=(I_{LED}+I_{AMB})-(I_{AMB}-I_{ERR})=I_{LED}+I_{ERR}$) is equal to the controllable-light-source current $I_{LED}$ plus the error current $I_{ERR}$ as shown in FIG. 6, and this makes the differential voltage signal be dependent on the sum of the controllable-light-source current $I_{LED}$ and the error current $I_{ERR}$. In the second duration $T_2$ the input current $I_{IN}$ (i.e., $I_{IN}=I_{PH\_T2}-I_{CAL}$) is equal to the photoelectric current $I_{PH}$ minus the calibration current $I_{CAL}$; in other words, the input current $I_{IN}$ (i.e., $I_{IN}=I_{PH\_T2}-I_{CAL}=(I_{AMB})-(I_{AMB}-I_{ERR})=I_{ERR}$) is equal to the error current $I_{ERR}$ as shown in FIG. 6, and this makes the differential voltage signal be dependent on the error current $I_{ERR}$. In the first duration $T_1$ the integrator 120 receives the differential voltage signal (dependent on "$I_{LED}+I_{ERR}$") from the switch circuit 130, and in the second duration $T_2$ the integrator 120 receives the inverted signal of the differential voltage signal (dependent on "$-I_{ERR}$") from the switch circuit 130; and accordingly, the overall influence caused by the error current $I_{ERR}$ in the first duration $T_1$ and the second duration $T_2$ is offset.

In an embodiment each of the first duration $T_1$ and the second duration $T_2$ is later than a preceding duration $T_0$ (e.g., T0 in FIG. 6); the controllable light source is not turned on in the preceding duration $T_0$ and the calibration current $I_{CAL}$ is not provided for the generation of the input current $I_{IN}$; accordingly, in the preceding duration $T_0$ the photoelectric current $I_{PH}$ includes the actual-ambient-light current $I_{AMB}$ without the controllable-light-source current $I_{LED}$, the input current $I_{IN}$ is equal to the photoelectric current $I_{PH}$, and the differential voltage signal is mainly the signal originated from the optical energy of the ambient light. The current-to-voltage conversion circuit 110 updates the calibration current $I_{CAL}$ in the preceding duration $T_0$ to make the calibration current $I_{CAL}$ (i.e., $I_{CAL}=I_{CAL\_T0}=I_{AMB}-I_{ERR}$) be equal to the actual-ambient-light current $I_{AMB}$ minus the error current $I_{ERR}$. The current-to-voltage conversion circuit 110 provides the calibration current $I_{CAL}$ for the generation of the input current $I_{IN}$ and does not update the calibration current $I_{CAL}$ in the first duration $T_1$ and the second duration $T_2$ so that the calibration current $I_{CAL}$ (i.e., $I_{CAL}=I_{CAL\_T1}=I_{CAL\_T2}$) remains constant in the first duration $T_1$ and the second duration $T_2$. It is noted that the current-to-voltage conversion circuit 110 may only update the calibration current $I_{CAL}$ in the preceding duration $T_0$, but the present invention is not limited thereto.

Please refer to FIG. 1. The switch circuit 130 is coupled between the current-to-voltage conversion circuit 110 and the integrator 120, and configured to forward the positive-end signal $V_+$ and the negative-end signal $V_-$ to the positive input terminal $IN_+$ and the negative input terminal $IN_-$ respectively in the first duration $T_1$ and forward the positive-end signal $V_+$ and the negative-end signal $V_-$ to the negative input terminal IN_ and the positive input terminal IN_+ respectively in the second duration T_2; in other words, the switch circuit 130 is configured to forward the differential voltage signal to the integrator 120 in the first duration T_1 and forward the inverted signal of the differential voltage signal to the integrator 120 in the second duration T_2.

Figure 5:
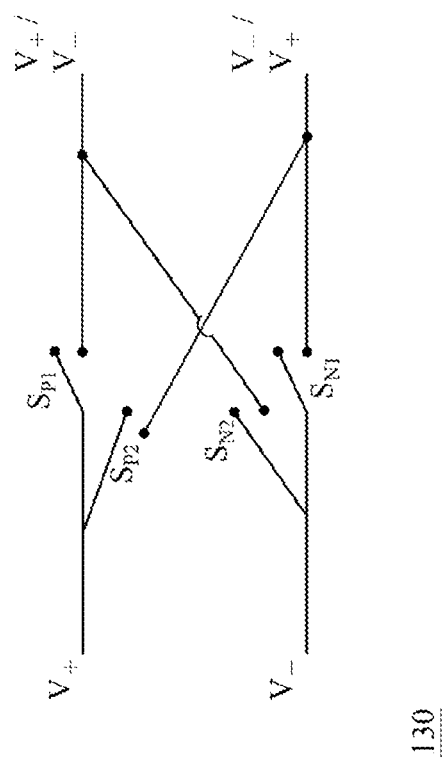
FIG. 5 shows an embodiment of the switch circuit of FIG. 1.

FIG. 5 shows an embodiment of the switch circuit 130 of FIG. 1. The switch circuit 130 of FIG. 5 includes a first positive-end switch $S_{P1}$, a first negative-end switch $S_{N1}$, a second positive-end switch $S_{P2}$, and a second negative-end switch $S_{N2}$. In regard to FIG. 1 and FIG. 5, the first positive-end switch $S_{P1}$ is set between the positive output terminal OUT_+ of the current-to-voltage conversion circuit 110 and the positive input terminal IN_+ of the integrator 120; the first negative-end switch $S_{N1}$ is set between the negative output terminal OUT_ of the current-to-voltage conversion circuit 110 and the negative input terminal IN_ of the integrator 120; the second positive-end switch $S_{P2}$ is set between the positive output terminal OUT_+ of the current-to-voltage conversion circuit 110 and the negative input terminal IN_ of the integrator 120; and the second negative-end switch $S_{N2}$ is set between the negative output terminal OUT_ of the current-to-voltage conversion circuit 110 and the positive input terminal IN_+ of the integrator 120. In the first duration T_1 the first positive-end switch $S_{P1}$ and the first negative-end switch $S_{N1}$ are turned on for conducting signals while the second positive-end switch $S_{P2}$ and the second negative-end switch $S_{N2}$ are turned off; accordingly, the differential voltage signal is forwarded to the integrator 120. In the second duration T_2 the first positive-end switch $S_{P1}$ and the first negative-end switch $S_{N1}$ are turned off while the second positive-end switch $S_{P2}$ and the second negative-end switch $S_{N2}$ are turned on for conducting signals; accordingly, the inverted signal of the differential voltage signal is forwarded to the integrator 120.

Please refer to FIG. 1. The ADC 140 is configured to generate a digital signal $D_{OUT}$ for analysis according to the analog output voltage (i.e., the differential output signal $V_{O+}, V_{O-}$) in a later duration $T_3$ (e.g., $T_3$ in FIG. 6), wherein the later duration $T_3$ is later than any of the first duration $T_1$ and the second duration $T_2$; for example, the later duration $T_3$ follows the second duration $T_2$ or the first duration $T_3$, or the later duration $T_3$ is later than the second duration $T_2$ or the first duration $T_1$ by a predetermined interval. It is noted that all the first positive-end switch $S_{P1}$, the first negative-end switch $S_{N1}$, the second positive-end switch $S_{P2}$, and the second negative-end switch $S_{N2}$ of the switch circuit 130 are turned off in the aforementioned preceding duration $T_0$ and the later duration $T_3$ in the embodiment of FIG. 1, but the implementation of the present invention is not limited thereto providing the implementation is practicable. It is also noted that the preceding duration $T_0$, the first duration $T_1$, the second duration $T_2$, and the later duration $T_3$ can repeat periodically or non-periodically as the PPG front-end receiver 100 operates. An exemplary relation between the input current $I_{IN}$ and the switches of the switch circuit 130 is illustrated with FIG. 6, wherein "$LED_{OFF}$" indicates that the aforementioned controllable light source is turned off, "$LED_{ON}$" indicates that the controllable light source is turned on, "$S_{P1\_OFF}$", "$S_{N1\_OFF}$", "$S_{P2\_OFF}$", and "$S_{N2\_OFF}$" respectively indicates that the first positive-end switch $S_{P1}$ is turned off, the first negative-end switch $S_{N1}$ is turned off, the second positive-end switch $S_{P2}$ is turned off, and the second negative-end switch $S_{N2}$ is turned off, and "$S_{P1\_ON}$", "$S_{N1\_ON}$", "$S_{P2\_ON}$", and "$S_{N2\_ON}$" respectively indicates that the first positive-end switch $S_{P1}$ is turned on, the first negative-end switch $S_{N1}$ is turned on, the second positive-end switch $S_{P2}$ is turned on, and the second negative-end switch $S_{N2}$ is turned on.

Figure 7:
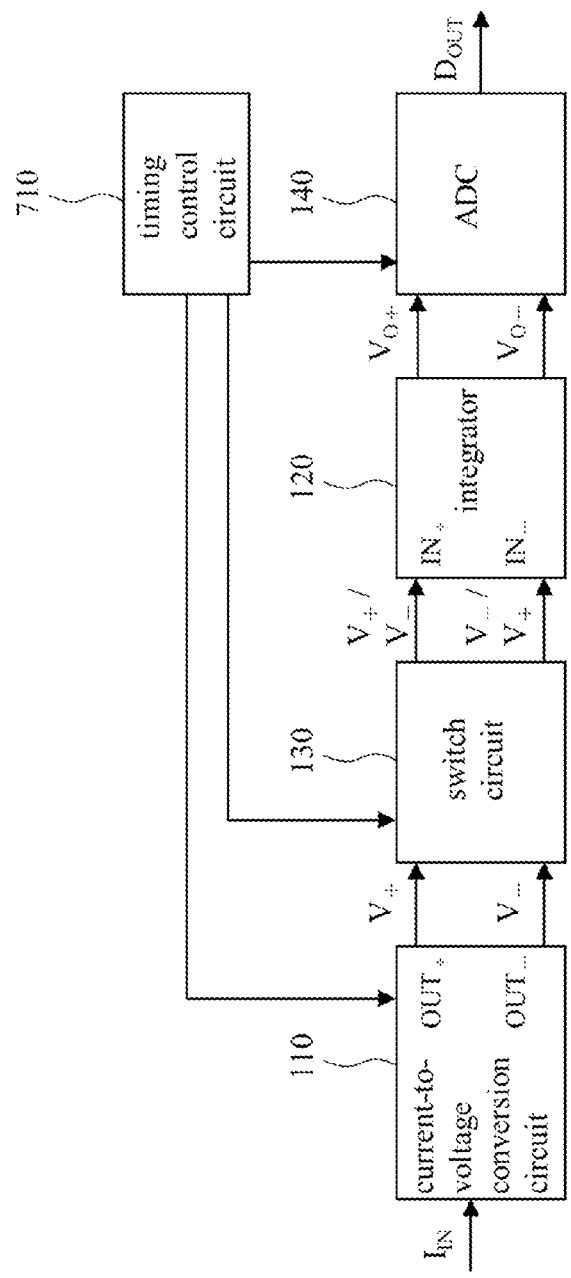
FIG. 7 shows another embodiment of the PPG front-end receiver of the present disclosure.

FIG. 7 shows another embodiment of the PPG front-end receiver of the present disclosure. In comparison with the embodiment of FIG. 1, the PPG front-end receiver 700 of FIG. 7 further includes a timing control circuit 710 configured to control the cooperation of all involved circuits in each duration according to a timing signal (e.g., clock signal) (not shown). For example, the timing control circuit 710 is configured to control the states of all switches of the switch circuit 130 in the first duration $T_1$ and the second duration $T_2$. For example, the timing control circuit 710 is configured to make the current-to-voltage conversion circuit 110 update the calibration current $I_{CAL}$ in the preceding duration $T_0$. For example, the timing control circuit 710 is configured to enable the ADC 140 in the later duration $T_3$ and disable the ADC 140 in the preceding duration $T_0$, the first duration $T_1$, and the second duration $T_2$. Since the timing control circuit 710 alone is common in this technical field, its detailed description is omitted here.

Figure 8:
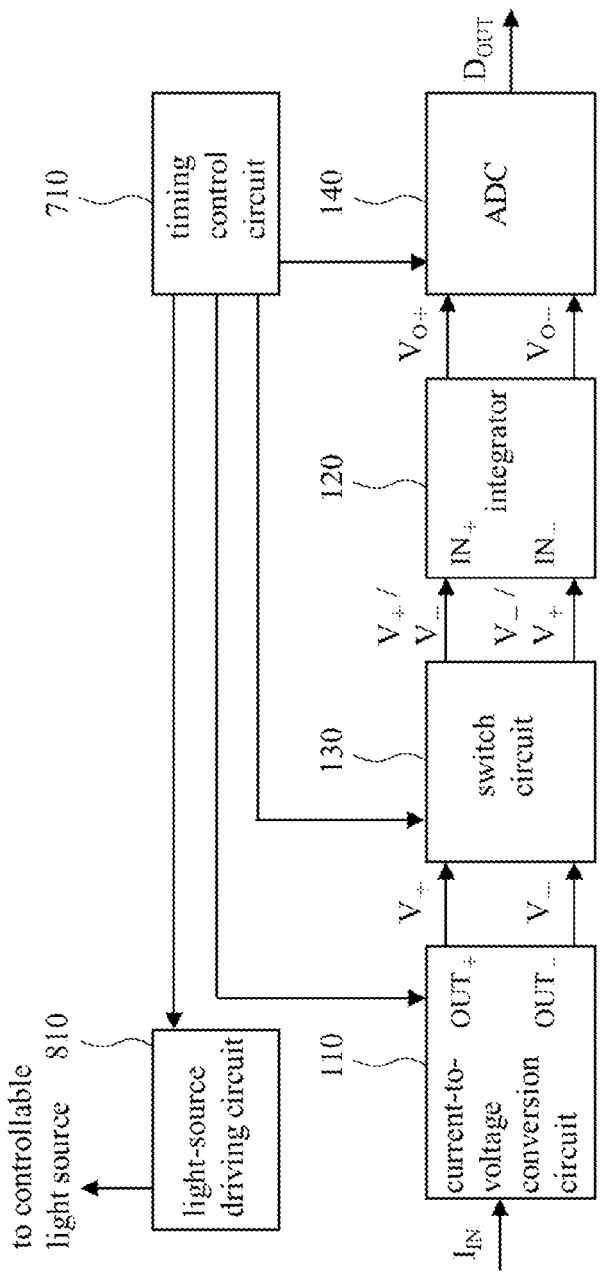
FIG. 8 shows yet another embodiment of the PPG front-end receiver of the present disclosure.

FIG. 8 shows yet another embodiment of the PPG front-end receiver of the present disclosure. In comparison with the embodiment of FIG. 7, the PPG front-end receiver 800 of FIG. 8 further includes a light-source driving circuit 810 configured to drive the aforementioned controllable light source. The timing control circuit 710 of FIG. 8 is configured to make the light-source driving circuit 810 turn on the controllable light source in the first duration $T_1$, and to make the light-source driving circuit 810 turn off the controllable light source in the second duration $T_2$. Since the light-source driving circuit 810 alone is common in this technical field, its detailed description is omitted here.

It is noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the PPG front-end receiver of the present disclosure can eliminate an error in the estimation of an ambient-light current.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A photoplethysmography (PPG) front-end receiver, comprising:
   a current-to-voltage conversion circuit configured to convert an input current into a differential voltage signal, wherein the current-to-voltage conversion circuit includes a positive output terminal and a negative output terminal, the positive output terminal is for outputting a positive-end signal of the differential voltage signal, the negative output terminal is for outputting a negative-end signal of the differential voltage signal, and the positive-end signal and the negative-end signal are complementary signals;
   an integrator configured to receive the differential voltage signal in a first duration and receive an inverted signal of the differential voltage signal in a second duration to output an analog output voltage, wherein the integrator includes a positive input terminal and a negative input terminal;

a switch circuit coupled between the current-to-voltage conversion circuit and the integrator, and configured to forward the positive-end signal and the negative-end signal to the positive input terminal and the negative input terminal respectively in the first duration and forward the positive-end signal and the negative-end signal to the negative input terminal and the positive input terminal respectively in the second duration, wherein the second duration is later or earlier than the first duration; and an analog-to-digital converter coupled to the integrator and configured to generate a digital signal according to the analog output voltage in a later duration, wherein the later duration is later than any of the first duration and the second duration.

2. The PPG front-end receiver of claim 1, wherein the current-to-voltage conversion circuit includes: a transimpedance amplifier configured to generate the differential voltage signal according to the input current; and an ambient-light estimation circuit configured to generate a calibration current according to the differential voltage signal, in which the calibration current is equal to a photoelectric current minus the input current.

3. The PPG front-end receiver of claim 2, wherein the ambient-light estimation circuit includes: a voltage detector configured to generate a detection signal according to the differential voltage signal; an ambient-light current estimation circuit configured to generate an estimation signal according to the detection signal; and an adjustable current source configured to generate the calibration current according to the estimation signal.

4. The PPG front-end receiver of claim 2, wherein each of the first duration and the second duration is later than a preceding duration; the current-to-voltage conversion circuit updates the calibration current in the preceding duration but does not update the calibration current in the first duration and the second duration so that the calibration current remains constant in the first duration and the second duration.

5. The PPG front-end receiver of claim 4, wherein the current-to-voltage conversion circuit only updates the calibration current in the preceding duration.

6. The PPG front-end receiver of claim 2, wherein the switch circuit does not conduct signals in the preceding duration.

7. The PPG front-end receiver of claim 2, further comprising: a photo detector configured to detect optical energy to generate the photoelectric current.

8. The PPG front-end receiver of claim 7, wherein in the first duration the photo detector generates the photoelectric current including a controllable-light-source current and an actual-ambient-light current; in the second duration the photo detector generates the photoelectric current including the actual-ambient-light current without including the controllable-light-source current; the calibration current remains constant in the first duration and the second duration and is equal to the actual-ambient-light current minus an error current; in the first duration the input current is equal to the controllable-light-source current plus the error current so that the differential voltage signal is dependent on a sum of the controllable-light-source current and the error current; in the second duration the input current is equal to the error current so that the differential voltage signal is dependent on the error current; and the integrator receives the differential voltage signal from the switch circuit in the first duration and receives the inverted signal of the differential voltage signal from the switch circuit in the second duration, and accordingly eliminates an overall influence caused by the error current in the first duration and the second duration.

9. The PPG front-end receiver of claim 1, wherein the switch circuit includes: a first positive-end switch set between the positive output terminal of the current-to-voltage conversion circuit and the positive input terminal of the integrator; a first negative-end switch set between the negative output terminal of the current-to-voltage conversion circuit and the negative input terminal of the integrator; a second positive-end switch set between the positive output terminal of the current-to-voltage conversion circuit and the negative input terminal of the integrator; and a second negative-end switch set between the negative output terminal of the current-to-voltage conversion circuit and the positive input terminal of the integrator.

10. The PPG front-end receiver of claim 9, wherein in the first duration the first positive-end switch and the first negative-end switch are turned on while the second positive-end switch and the second negative-end switch are turned off; in the second duration the first positive-end switch and the first negative-end switch are turned off while the second positive-end switch and the second negative-end switch are turned on; and in the later duration all the first positive-end switch, the first negative-end switch, the second positive-end switch, and the second negative-end switch are turned off.

11. The PPG front-end receiver of claim 1, further comprising: a timing control circuit configured to control the switch circuit in the first duration and the second duration and to enable the analog-to-digital converter in the later duration.

12. The PPG front-end receiver of claim 11, wherein the timing control circuit is further configured to make the current-to-voltage conversion circuit update the calibration current in a preceding duration that is earlier than any of the first duration and the second duration.

13. The PPG front-end receiver of claim 11, wherein the timing control circuit is further configured to make a light-source driving circuit turn on a controllable light source in the first duration, and to make the light-source driving circuit turn off the controllable light source in the second duration.

14. The PPG front-end receiver of claim 13, further comprising: the light-source driving circuit.

* * * * *